A. DE LASKI & P. D. THROPP.

FABRIC AND YARN THEREFOR.

APPLICATION FILED JAN. 11, 1911.

Reissued Apr. 2, 1912.

13,393.

Witnesses:
J. George Barry.
Harry S. Fischer

Inventors:-
Albert de Laski and
Peter D. Thropp
by their attorneys
Brown & Seward

UNITED STATES PATENT OFFICE.

ALBERT DE LASKI, OF WEEHAWKEN, AND PETER D. THROPP, OF TRENTON, NEW JERSEY, ASSIGNORS TO DE LASKI & THROPP CIRCULAR WOVEN TIRE COMPANY, OF TRENTON, NEW JERSEY, A CORPORATION OF NEW JERSEY.

FABRIC AND YARN THEREFOR.

13,393. Specification of Reissued Letters Patent. Reissued Apr. 2, 1912.

Original No. 807,178, dated December 12, 1905, Serial No. 267,929. Application for reissue filed January 11, 1911. Serial No. 602,114.

*To all whom it may concern:*

Be it known that we, ALBERT DE LASKI and PETER D. THROPP, citizens of the United States, and residents, respectively, of Weehawken, in the county of Hudson and State of New Jersey, and of Trenton, in the county of Mercer and State of New Jersey, have invented a new and useful Fabric and Yarn Therefor, of which the following is a specification.

This invention relates to a fabric and more particularly to a strong fabric for use in connection with pneumatic wheel-tires, fire-hose, &c., wherever resistance to high pressure and great endurance are required.

While we have chosen a circular-woven tubular fabric to illustrate this invention, we wish it to be understood that we do not limit the invention to such a style of fabric, but intend that it shall apply as well to a flat woven fabric and to a fabric whether the threads or yarns cross each other at right angles or at an oblique angle.

Figure 1:
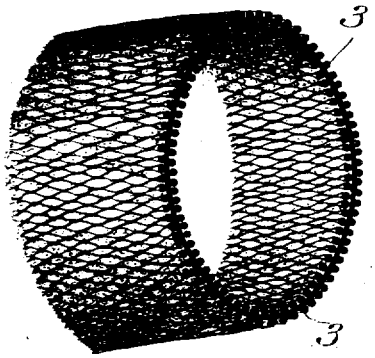
Figure 2:
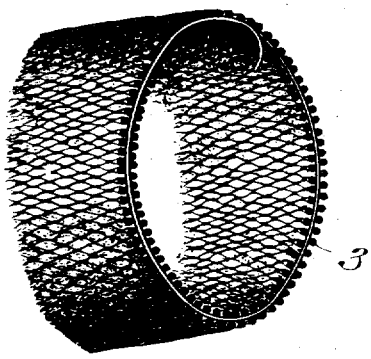
Figure 3:
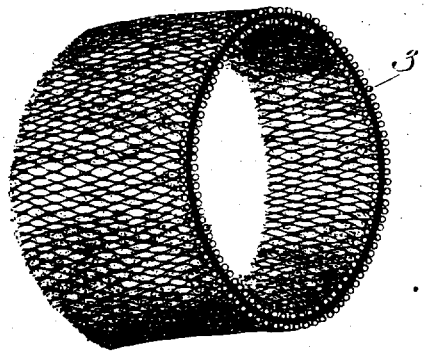
Figure 4:
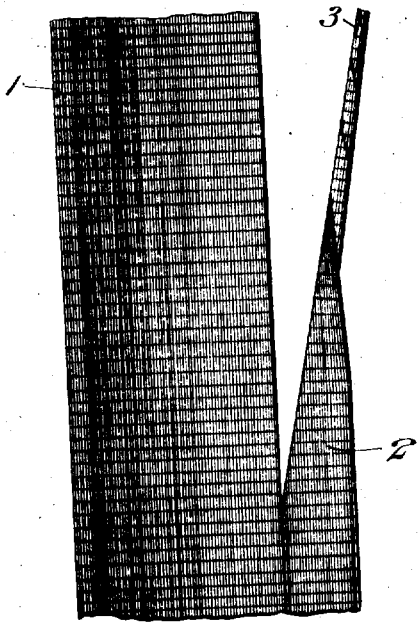

In the accompanying drawings, Figure 1 is a view in perspective of a piece of circular-woven tubular fabric in which the weft and warp are both formed of rubber-treated twisted fabric, Fig. 2 is a similar view in which the warp is formed of rubber-treated twisted fabric and the weft of ordinary yarn or thread, Fig. 3 is an end view showing the weft formed of rubber-treated twisted fabric and the warp of ordinary yarn or thread; and Fig. 4 is a view of a portion of rubber-treated fabric, showing a strip partially severed therefrom and partially twisted to illustrate the manner of forming the weft and warp threads of the fabric, one or both.

In making the fabric we form the warp and weft threads or yarns, one or both, of rubber-treated twisted fabric. This fabric may consist of what is commonly known in the art as "friction duck," or it may be made especially for the purpose, and consists, essentially, of a fabric impregnated or faced with a rubber solution. A piece of this fabric is indicated at 1, and this fabric is slit into strips, (indicated by 2) and these are twisted, as shown at 3, to form the yarn or thread which is subsequently to be used as the warp or weft, one or both, of the fabric.

In manufacturing upon a commercial scale the rubber-treated fabric is slit into strips as it comes from the treating-rolls, and these are fed continuously to a twisting-machine to produce the yarn or thread required. In twisting this strip of fabric the rubber solution with which it is treated causes its twisted faces to adhere, and the twist is thereby maintained during the subsequent manipulation of the thread or yarn. When these threads or yarns have been woven into a fabric, the latter is submitted to a vulcanizing process, and the fabric becomes thereby one coherent mass of tough resilient material having great strength and durability and at the same time is so dense that air will not escape through it.

This fabric may alone form the wall of a tire or hose, or it may be used as one of the elements of a tire or hose, as may be found desirable.

By making the yarn or thread of twisted fabric which has previously been treated with the rubber solution we are enabled to insure the distribution of the rubber solution throughout the interior of the thread or yarn as well as on its surface, and, furthermore, the cost of manufacture is maintained at a low figure because of the simple structure of the yarn or thread and its tenacity in maintaining the twisted condition due to the friction between its walls. When vulcanized or cured, the threads are affected throughout their interior mass as well as along their exterior, so that the fabric becomes tough and pliable throughout its entire mass.

What we claim is:—

1. A fabric having incorporated therein a thread of twisted rubber-treated fabric.

2. A fabric composed of weft and warp threads, the warp-threads consisting of twisted rubber-treated fabric.

3. A fabric composed of weft and warp threads, the weft-threads composed of twisted rubber-treated fabric.

4. A fabric composed of weft and warp threads, the weft and warp threads consisting of twisted rubber-treated fabric.

5. A fabric including threads formed of twisted rubber-treated strips, the said strips being formed from a sheet of rubber-treated material having embedded therein a series of threads.

6. A yarn consisting of a twisted strip of rubber-treated material.

7. A yarn consisting of a twisted strip of rubber-treated parallel strands.

8. A yarn consisting of a twisted strip of rubber-treated parallel and cross strands.

In testimony that we claim the foregoing as our joint invention we have signed our names, in the presence of two witnesses, this 9th day of January, 1911.

ALBERT DE LASKI.
PETER D. THROPP.

Witnesses:
CLIFFORD W. LEE,
LEON SLEIFER.